(12) United States Patent
Belloni et al.

(10) Patent No.: US 7,207,699 B2
(45) Date of Patent: Apr. 24, 2007

(54) SYSTEM OF LIGHT UNITS

(75) Inventors: Paola Belloni, Traunreut (DE);
Joachim Leibig, Traunwalchen (DE);
Peter Prodell, Trostberg (DE); Jürgen Brüggemann, Traunreut (DE); Sonja Ferdows, Traunstein (DE); Hans-Peter Königstein, Palling (DE); Martin Kroke, Traunreut (DE); Reinhold Priller, Ainring (DE); Josef Wolkersdorfer, Traunstein (DE); Thomas Klimiont, Allersberg (DE)

(73) Assignee: Siteco Beleuchtungstechnik GmbH, Traunreut (DE)

( * ) Notice: Subject to any disclaimer, the term of this patent is extended or adjusted under 35 U.S.C. 154(b) by 0 days.

(21) Appl. No.: 09/802,275

(22) Filed: Mar. 8, 2001

(65) Prior Publication Data

US 2001/0036078 A1 Nov. 1, 2001

(30) Foreign Application Priority Data

Mar. 9, 2000 (DE) ................................ 100 11 516

(51) Int. Cl.
*F21S 10/00* (2006.01)

(52) U.S. Cl. ...................... 362/327; 362/551; 362/560; 362/633; 362/634; 362/330; 362/240

(58) Field of Classification Search ................ 362/551, 362/560, 27, 97, 330, 31, 223, 240, 244, 362/327, 339, 329, 600, 604, 605, 632, 633, 362/634
See application file for complete search history.

(56) References Cited

U.S. PATENT DOCUMENTS 3,922,073 A * 11/1975 Schwartz .................... 362/355
4,602,448 A * 7/1986 Grove .......................... 40/541
5,027,258 A * 6/1991 Schoniger et al. ............ 362/31
5,043,850 A * 8/1991 Dreyer, Jr. .................... 362/26
5,046,826 A * 9/1991 Iwamoto et al. .............. 359/49
5,122,940 A    6/1992 Wiegand
5,207,504 A * 5/1993 Swift et al. ................. 362/260
5,396,350 A    3/1995 Beeson et al.
5,477,422 A * 12/1995 Hooker et al. ................ 362/29
5,555,109 A    9/1996 Zimmerman et al.
5,575,962 A * 11/1996 Takahashi .................... 264/2.5
5,692,822 A * 12/1997 Dreyer ......................... 362/32
5,704,703 A *  1/1998 Yamada et al. ............... 362/27
5,863,114 A *  1/1999 Nagatani et al. ............ 362/328
5,982,540 A * 11/1999 Koike et al. ................. 359/487
5,988,841 A * 11/1999 Simon ......................... 362/551
6,185,357 B1   2/2001 Zou et al.
6,290,364 B1 * 9/2001 Koike et al. .................. 362/31

FOREIGN PATENT DOCUMENTS

DE     89 15 821 U1   9/1992
DE    299 03 847 U1   3/2000
EP       0 453 956   10/1991
EP       0 846 915    6/1998

* cited by examiner

*Primary Examiner*—Sandra O'Shea
*Assistant Examiner*—Sharon Payne
(74) *Attorney, Agent, or Firm*—Duane Morris LLP

(57) ABSTRACT

A system composed of a plurality of light units with each light unit having different light emission properties. The component parts of each of the light units, such as optically effective components that influence the beam path of the light emitted by the lamp, and end cap reflectors are of a standard dimension so that light units of different configurations can use the same elements to reduce the number of different parts required for the group of different light units of the system.

30 Claims, 6 Drawing Sheets

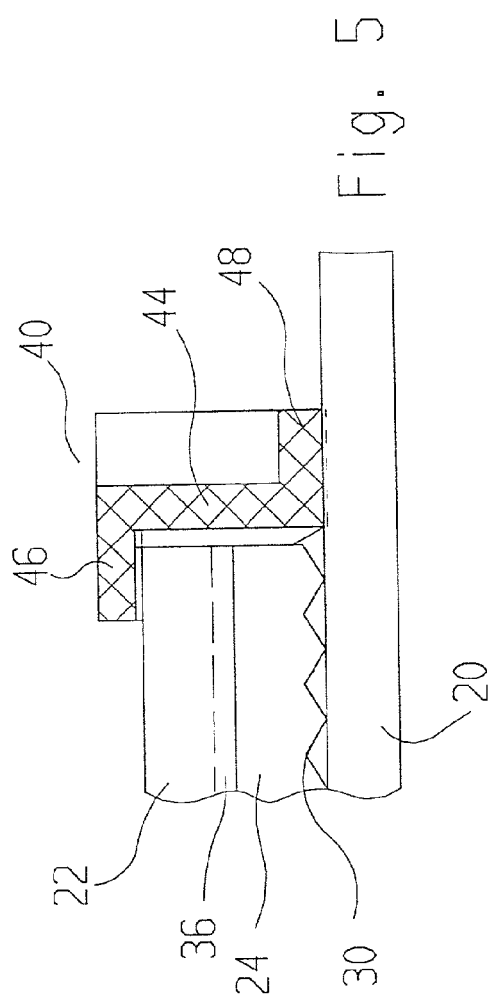
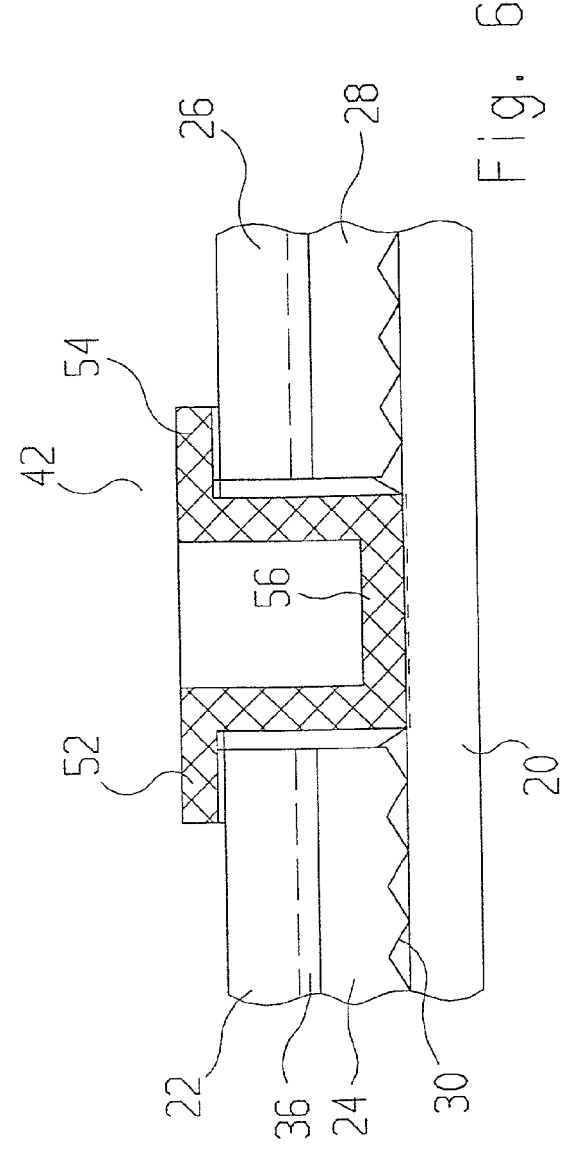

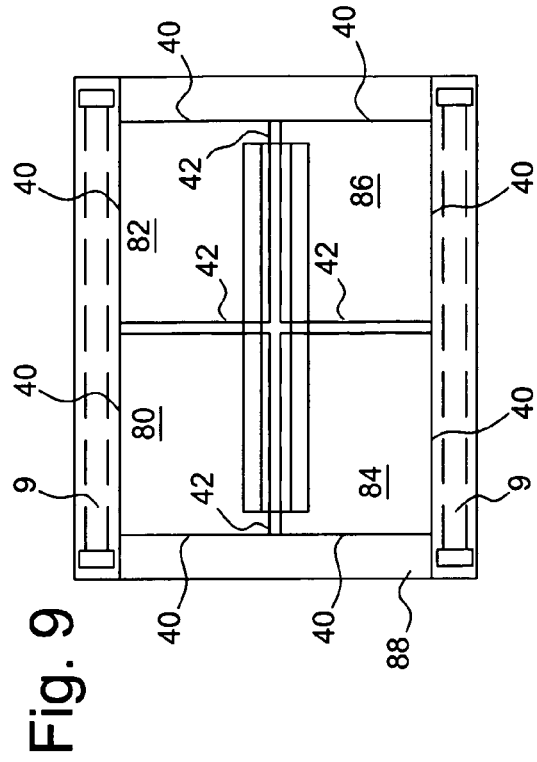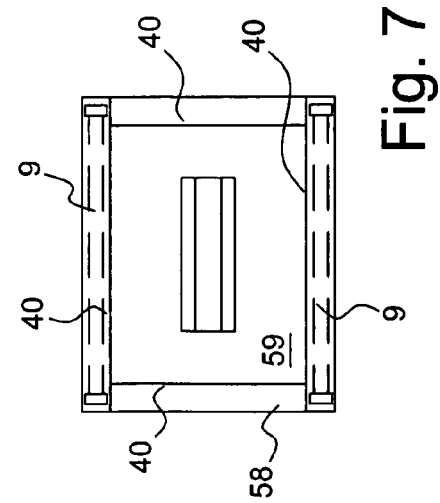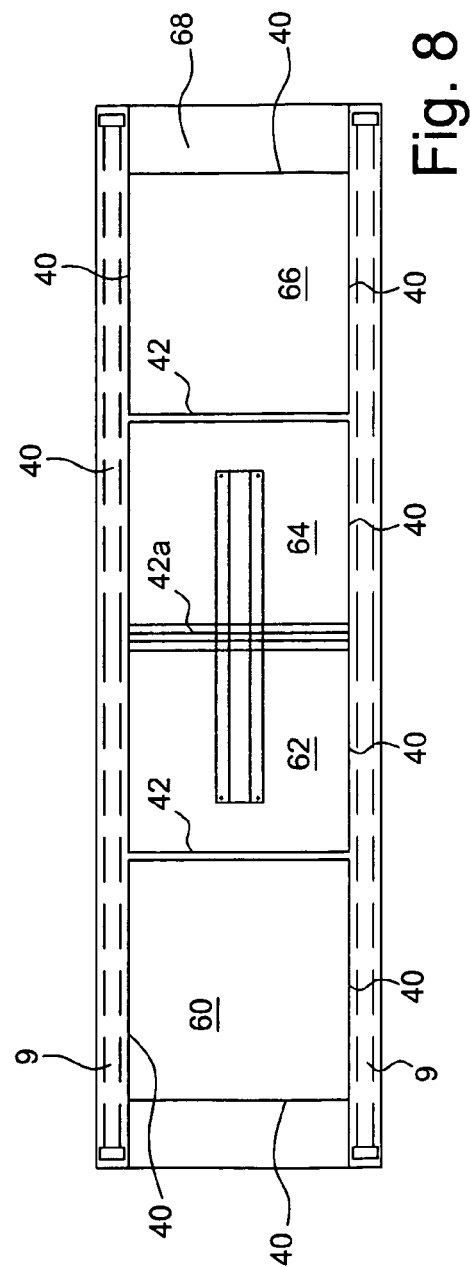

SYSTEM OF LIGHT UNITS

BACKGROUND OF THE INVENTION

The invention is directed to a system of light units, particularly a system of indoor light units.

Particularly given indoor lights, light units, luminaires or the like, the multi-faceted lighting jobs that occur indoors and the frequently changing spatial prescriptions, for example given recessed lights, lead to what are in part extremely different forms and light-oriented designs. For example, lights for picture screen workstations require a shielding, i.e., a lowering of the average luminance at the light exit face above a boundary angle to the perpendicular relative to the light exit face in a plurality of planes for a shielding angle of, for example 60° as required by the applicable standards and proposed standards, so that the limit value of the luminance according to these standards and proposed standards lies at 200 cd/m$^2$, 500 cd/m$^2$ or 1000 cd/m$^2$. For other types of lights or light units, for example wall washers or ceiling washers, completely different demands are made of the distribution curve of the light intensity. Accordingly, the light technology of previous light units had to be individually adapted to the respective function and, potentially, also had to be adapted to the respective spatial prescriptions. For example, the shielding is conventionally achieved by the reflector walls and/or by a lamella grid. A change of the shielding angle in the direction perpendicular to the lamp axis requires, for example, a change in the structural height of the electrical devices, which requires a change in the housing. Likewise, the remodeling of a directly emitting light units into an indirectly emitting light unit according to the conventional technique requires a complete replacement of the reflector. Accordingly, a great number of individual parts had to be manufactured for the individual light units and this increased the manufacturing costs.

SUMMARY OF THE INVENTION

An object of the invention is to make a possibility available as to how lights, light units, luminaires or the like, particularly indoor light units of various types, can be more rationally manufactured.

This object is inventively achieved by a system of light units or luminaires composed of a plurality of light units having different light emission properties, particularly recessed light units, built-in light units and/or pendulum light units that respectively have at least one hollow light guide with a cavity into which light from one or more lamps is beamed and has at least one light output device for outputting light from the hollow light guide to a light exit face. The light output device comprises at least one light-permeable element, particularly a light-transmissive plate, having a boundary surface between two media with a different refractive index that is provided with a light-refractive structure in at least one plane directed perpendicularly to the light exit face such that the light intensity distribution curve of the light emerging at the light exit face is influenced in this plane. The light units comprise a supporting structure, particularly a housing, at or in which at least one optically effective or active element or component that influences the beam path of the light output by the lamp, particularly a light output device, a cap or roof reflector or at least one other reflective and/or light-transmissive element of the hollow light guide and/or an input reflector for coupling light from the lamp into the hollow waveguide is attached. The improvements are that at least one optically effective or active component that influences the beam path of the light emitted by the lamp, particularly a reflective or light-refractive element, is a prefabricated component for every light unit that is dimensioned so that it can be attached and/or installed as an optically effective element at or, respectively, in each supporting structure of a light unit of the system.

The invention is particularly directed to systems of light units wherein at least some of the light units, particularly all units, have the lamp or lamps arranged outside the hollow light guide and which lamp or lamps couple light into the hollow light guide from the outside. The light input in the light units of the system can, in particular, occur laterally proceeding from a narrow side.

What is to be understood by a system of light units in this context is a group or set of real light units that are respectively constructed as described above and that have the common feature in structural terms that at least one optically effective or active component having said properties can be employed at the support structure of each light unit. Various light units can comprise mutually corresponding components at corresponding locations of the respective support structure for which the dimensions relevant for the mounting, for example length and width, are identical but that have different optical properties. The totality of the specific light unit forms the system of light units.

The aforementioned light-refractive structure that deflects light in a directed fashion and influences the light intensity distribution curve in a plane can, in particular, be a light-refractive structure that essentially prevents a light emission above a limit angle in at least one plane perpendicular to the light exit surface so that a shielding of light emerging at the light exit face is produced in this plane.

What is understood by a shielding is the lowering of the average luminance at the light exit face above a boundary angle to a perpendicular to the light exit face below a predetermined limit value, for example 200 cd/m$^2$, 500 cd/m$^2$ or 1000 cd/m$^2$.

The aforementioned light-refractive structure can, however, also influence the distribution curve of the light intensity in some other way. For example, a wide-angle light intensity distribution can be produced with a suitable selection of the structure elements, wherein the light intensity distribution curve has a minimum in the region of 0° and has a pronounced maximum in the region between 0° and 90°, whereby the position of the maximum is dependent on the elements of the light-refractive structure employed but is also probably dependent on other components such as, for example, the cap reflector of a hollow light guide. Dependent on the design of the light unit, such a light-angle light intensity distribution can be symmetrical or asymmetrical.

The invention can provide that, in every light unit, at least a cap reflector, an element of the light output device having a light-refractive structure and/or an input reflector is a prefabricated component that is dimensioned so that it can be attached and/or installed at or, respectively, in each support structure.

It can be provided that, for all light units of the system, at least one element of the light output device provided with a light-refractive structure, a cap reflector and/or an input reflector is dimensioned essentially the same in view of the dimensions relevant for the installation or, respectively, attachment in the support structure and preferably comprises the same installation or attachment dimensions overall.

The relevant dimensions are dependent on the details of the support structure. For example, the height of the component can vary when the support structure or the design of the light unit overall does not impose a restriction with respect to this dimension.

The invention provides a system whose elements are constructed in modular fashion, whereby elements of this module can, for example, be input reflectors, cap reflectors and/or prism plates as well as, potentially further elements that can be employed in all light units of the system.

In particular, the invention can provide that a light-technical function unit such as light input device or a light output device is modularly constructed of a plurality of elements. For example, the light input from the lamps into the hollow light guide can occur by means of a plurality of input reflectors having standardized dimensions that are attached to one another in the longitudinal direction of the lamp. Likewise, the light output device can be composed of a plurality of plates having light-refractive structures that have standardized dimensions. Preferably, such a light-technical unit is constructed of elements which have the same dimensions.

In the inventive system, a plurality of light units can have the same support structure and can respectively differ on the basis of one or more optically effective components secured to the support structure that respectively have the same dimensions but exhibit different light-oriented properties.

The optically effective component can, in particular, be a reflective or a light-refractive element, for example an input reflector, a cap reflector of the hollow light guide and/or a light output device or, respectively, a prism plate or prism foil.

It can be provided in an inventive system of light units that one or more first light units comprise an exclusively reflective cap reflector and one or more second light units comprise partially light-transmissive cap reflector for the output of an indirect light part. The cap reflector of the first light units is dimensioned so that it can be attached and/or installed at, or, respectively, in the support structure, and the cap reflector of the second light units is dimensioned so that it can be attached and/or installed at or, respectively, in the support structure. By exchanging the cap reflector, an exclusively directly emitting light unit can, for example, be converted into an indirectly emitting light unit and vice versa.

It can also be provided that at least two light units of the system comprise a cap reflector that is respectively dimensioned such that it can be inserted into or attached to the support structure of the respectively other light unit. The cap reflector of the one light unit comprises different reflection properties from the cap reflector of the other light unit, particularly in view of the distribution of the reflected light. As a result of the modification of the reflection properties of a cap reflector, the light intensity distribution can be among the things that is influenced. In particular, asymmetrical light intensity distributions can be achieved in this way.

The inventive system can also provide that at least two light units of the system have one or more plates in the respective light output device having a light-refractive structure as a component part of the light output device. These plates are dimensioned so that they can be introduced into or attached to the support structure of the respectively other light unit and the plates of the one light unit have a different light-refractive structure than the plates of the other light unit.

Instead of a plate, some other planar element having a light-refractive structure can be employed, for example a foil, and this element should preferably be stable in shape or be a component part of a unit that is stable in shape. That stated below with respect to plates applies analogously to foils as well, even when this is not expressly mentioned.

The light-refractive structure can, for example, be formed into the plates or fashioned in a foil that is attached onto the plate, for example glued on.

For example, it is thus possible by replacing the prism plate or, respectively, prism plates (or a corresponding foil) to convert a light unit having a shielding for picture screen work stations into a light unit having a wide-angle light intensity distribution or a light unit having an asymmetrical light intensity distribution, a wall washer, a ceiling washer or a wall fixture.

In particular, it can be provided that at least one plate of the one light unit comprises the same dimensions relevant for the installation or attachment to the support structure as a plate of the other light unit and preferably comprises the same installation or attachment dimensions.

The plates or foils having the light-refractive structure need not necessarily be directly secured to the support structure of the respective light unit; rather, for example, they can also be connected to a carrying plate that is in turn connected to the housing or to some other support structure. The dimensions of the plate must then enable a mounting into a corresponding opening of the hollow light guide.

It can be particularly provided that a plate or plates of the one light unit comprise the same length and width as the plate or, respectively, plates of the other light unit.

The invention can also provide that an input reflector of one or more first light units is different from an input reflector of one or more second light units and is dimensioned so that the input reflector of the first light units can be attached and/or installed at or, respectively, in the support structure of the second light units and vice versa.

It can also be provided that an input reflector of the first light units completely reflects light into the hollow light guide, and the input reflector of the second light units allows light to partially pass or reflects light partially past the hollow light guide for output of an indirect light part.

The design of the reflector, whether a cap reflector or an input reflector, for outputting an indirect light part can ensue in various ways. For example, a second light output device having a light-refractive structure can be provided in the reflector, and this device partially reflects light and partially couples light out. The reflector can also have either perforations having different dimensions or surfaces having different transmission properties. For example, an input reflector can be constructed so that it outputs the light of the lamp through an opening extending in its longitudinal direction.

It is provided in a specific system of light units that, for a group of light units, the light output face via which light is coupled out from the hollow light guide is different for at least two different light units of this group. The light output device for at least a part of the light units of the group has plates arranged side-by-side that are respectively provided with a light-refractive structure that deflects light in a directed fashion, particularly a light-refractive structure generating a shielding, so that at least one plate having a light-refractive structure deflecting light in the directed fashion has the same basic shape and the same relevant dimensions, for example length and width for all light units of this group as a corresponding plate of all other light units of the group.

The group can, in particular, also be identical to the entire system, i.e. comprise all light units of the system.

It can thereby be provided that all plates of a light unit of the group, which plates have a light-refractive structure for deflecting light in a directed fashion, have the same basic shape and the same dimensions as the plates with a light-refractive structure of a different structure for all other light units of the group.

According to this embodiment, the light output device, which have different dimensions for different light units, are at least partially constructed of standardized plates. Preferably, the light exit openings are likewise standardized so that they can be constructed of a given plurality of standardized plates with fixed dimensions carrying a light-refractive structure. This, however, will not be capable of being standardized always and for all light-oriented applications of the light units of the system. In order to compensate for discrepancies between the dimensions of the standardized plate and the dimensions of the light exit face, for example, a prism plate can be cut during mounting, so that the prism plates that are provided can be inserted overall into the light exit opening.

The invention can also provide that the plate or plates are separated from one another or from the housing of the hollow light guide for at least one light unit of the system by a plurality of spacer elements, particularly frames or frame elements, which have different dimensions.

In this way, it is possible to compensate for discrepancies between the dimensions of the prescribed light output face or, respectively, light exit face and the dimensions prescribed by the standardized plates. In order, for example, to bridge this discrepancy, a frame element that is thicker than other frame elements can be inserted between two plates.

Alternatively, it is also possible to mount the standardized plates spaced from one another on a carrier plate and to fashion the regions of the carrier plate which remain free—insofar as this is required for the light-oriented job that has been raised—by, for example, either silk screening, lacquering or sand blasting so that a light passage into the corresponding regions is either impeded or prevented or light is dispersed in these regions.

The invention also makes a method available for manufacturing a plurality of light units of a system that is composed of a plurality of light units having different light emission properties. The light units comprise at least one hollow light guide having a cavity into which light is beamed from one or more lamps and have at least one output device for coupling light out of the hollow light guide to a light exit face, so that the light output device comprises at least one light-transmissive element, for example a plate, having a boundary surface between two media with a different refractive index that is provided with a light-refractive structure that deflects light directed in at least one plane perpendicular to the light exit face so that the light intensity distribution curve of the light emerging at the light exit face in this plane is influenced. The light units have a support structure, particularly a housing, at or in which at least one optically effective element that influences the beam path of the light emitted by the lamp is attached or installed. The method comprises the following steps:

providing or offering a support structure for different light units;

providing or offering a plurality of units of an optically effective component for influencing the beam path of the light emitted by the lamp, said component having dimensions that are compatible with every provided support structure, preferably with the support structure of all light units of the system, so that the component can be installed in and/or attached to each of the provided support structures; and attaching these components in or at the provided support structures of the various light units.

According to this method, a standardized component is mounted at all light units, whereby further components that differ for different light units can be mounted in order to produce the different light-oriented properties.

The component can, in particular, be either an input reflector, a light output device, a plate with a light-refractive structure or a reflective cap wall. The support structure can be identical for a plurality of the light units.

Further steps for manufacturing different light unit types within the system derive from the above-described light unit types that can be present within a system.

The invention, in particular, also makes a method available for a modular manufacture of a light unit.

According to one aspect of the invention, a method is made available for manufacturing a light unit, particularly a recessed, add-on, floor or pendulum light unit, having at least one hollow light guide into which light is beamed from one or more lamps, and having at least one light output device for outputting light from the hollow light guide to a light exit face, whereby the light output device has at least one boundary surface between two media which have different refractive indices. The boundary surface is provided with a light-refractive structure that deflects light directed perpendicular to the light exit face in at least one plane so that the light intensity distribution curve of the light emerging at the light exit face is influence in this plane, and the light unit comprises a support structure, particularly a housing, to which one or more prefabricated, optically effective component parts that influence the beam path of the light emitted by the light unit are attached, and the structure defines a specific surface for the acceptance of these optically effective component parts. The method comprises the following steps:

offering or providing one or more pre-fabricated, optically effective components having predetermined dimensions;

arranging the component or components so that the predetermined surface is completely filled or is filled except for one or more regions whose dimensions are smaller than the dimensions of the component; and fastening the components to the support structure in conformity with this arrangement.

In the method, the insertion of one or more spacer elements can be provided between or next to the component or the components so that the predetermined surface is completely filled by the spacer elements and the component or, respectively, the components, and the components and the spacer elements are secured to the support structure so that the predetermined surface is filled. In particular, it can also be provided that at least two of the spacer elements have different dimensions.

The invention can also provide that the light output device has a light output surface via which light is coupled out of the hollow light guide and has a predetermined dimension. The method comprises the following steps:

offering or providing one or more light-transmissive plates having a light-refractive structure producing a shielding at a base area;

arranging the plate or plates so that a predetermined area that corresponds to the light exit face is completely filled or filled except for one or more regions whose dimensions are smaller then the dimensions of the plates, whereby spacings from one another or from the edge of the predetermined surface can remain next to or between the plates; and fastening the plates in an opening of the housing of the hollow light guide in this arrangement.

The invention can provide the insertion of one or more spacer elements between or next to the plate or the plates so that the predetermined surface is completely filled by the plate or, respectively, plates and the spacer elements, and can also provide the fastening of the plates and of the spacer elements in an opening of the housing of the hollow light guide so that these limit the cavity of the hollow light guide and, in particular, can thereby provide the connection of at least a part of the spacer elements and of the plate or, respectively, at least a part of the plates to a plate lying thereabove to form a unit.

The spacer elements can, in particular, be frame elements that hold a plurality of plates together or can also serve for supporting a single plate at the housing of the hollow waveguide or at the lamp housing.

It can also be provided that, for forming the light output device, a plurality of plates having a light-refractive structure that generates a shielding are arranged side-by-side, at least two thereof comprising the same shape and the same dimensions.

The invention is based on the surprising perception that it is possible in a significantly greater scope then hitherto possible to construct interior light units of standardized parts when a hollow light guide is employed as a light-oriented basic unit. The reason for this is, on the one hand, that hollow light guides can be realized with a relatively slight structural height that can be unproblemmatically integrated into the housings of the light units for the greatest variety of light-oriented applications. The output of an indirect light part given a hollow light guide can be realized, for example, in that a wall, for example the roof wall, is fashioned partially light-transmissive. As a result of a corresponding shape of the cap reflector, the shape of the light intensity distribution curve can also be modified without modifying the shielding conditions. Added thereto as a further advantage is that plate-shaped, light-refracted elements are employed for defining the light intensity distribution curve at a light exit face. These elements are realized with essentially the same dimensions regardless of the desired, light-oriented function, and are therefore capable of being interchanged between different light units. For example, a light unit for picture screen work stations can be converted into a light unit having an asymmetrical light emission characteristic by simply replacing a prism plate. Likewise, other light-oriented elements, for example input reflectors, can be easily modularly combined with a hollow light guide.

A particular aspect of the present invention is the possibility of constructing specific light-oriented devices, for example the light output device, modularly from standardized basic elements.

The inventive system particularly comprises light units or luminaires, for example recessed, add-on or pendulum light units wherein the light output device comprises at least one or more units having at least two plates or foils connected to one another. The unit or units are inserted into an opening of the housing of the hollow light guide, which opening limits the cavity of the hollow light guide.

According to one embodiment of light units of the system, the light output device comprises a plurality of plates arranged next to one another that are respectively provided with a light-refractive structure on a base area that generates a shielding.

It can be inventively provided that the light output device of a light unit comprises a stack of at least two plates preferably having the same base area that are respectively provided with a light-refractive structure for generating a shielding. The light-refractive structure of a first plate in a first plane perpendicular to the light exit face essentially prevents the light output above a limit angle relative to the perpendicular vis-a-vis the light exit face. The light-refractive structure of a second plate either does not prevent or only prevents the light emission above a larger limit angle in the front plane, and the light-refractive structure of the second plate essentially prevents a light emission in a second plane perpendicular to the light exit face above a limit angle relative to a perpendicular vis-a-vis the light exit face. The first plate either does not prevent or only prevents the light output above a larger limit angle in the second plane. In particular, the invention can provide that the light output device comprises a plurality of the stacks that are arranged next to one another in order to form the light output face of the light output device.

The invention can provide that the light-refractive structure of the plates of a light output device comprises line-shaped, light-refractive structural elements or is composed of these elements. The elements have side walls essentially parallel to the line direction that describe an angle a the free end of the structure elements that preferably lies in a range from 90° through 130° for light units having shielding greater than 90° and that, according to a specific embodiment of the invention, can lie in a range from 110° through 128°. The above-indicated angular ranges from 90° through 130° or, respectively, 110° through 128° are particularly preferred for plates composed of a material having a refractive index of approximately 1.49, but the ranges can also be employed given materials having a refractive index that does not differ all that much from 1.49. This applies to standard materials such as glass or polymethylmethacrulate. Fundamentally, however, the preferred angular ranges can be different for materials having a refractive index different from 1.49, and these preferred angular ranges for these refractive indices can be determined so that the same shielding angles are achieved for a predetermined limit value of the luminance as in the above-specified angular range of 90° through 130° or, respectively, 110° through 128° given a refractive index of 1.49. According to the preferred embodiments, however, this angle should fundamentally be greater than 90° independently of the refractive index for light units with shielding. Preferably, this angle is the same in all structure elements that, moreover can also all have the same cross-sectional shape and, potentially, identical dimensions as well. Other angles can be expedient for light units without shielding, whereby angles differing from 90° are also preferred here.

The limit value of the luminance for a shielding can lie at 200 cd/m$^2$, 500 cd/m$^2$ or 1000 cd/m$^2$ in conformity with the prevailing standards or, respectively, proposed standards. The shielding angle in standard applications lies in the range of more than 45°, preferably in a range from 50° through 75°, and particularly in a range from 50° through 65°.

According to the preferred embodiment of the invention, the light-refractive structure elements have a constant cross-section along the line direction that, in particular, can assume the shape of a triangle. The sidewalls of the elements, however, need not be planar but can also be curved. Whereas the side walls directly adjoin one another at the free end of the structure elements according to a preferred embodiment, it can also be provided that the free end of the structure elements is flattened and the side walls are connected by a planar or curved surface. In the case of planar lateral surfaces or lateral surfaces having a planar section at the free end, the aforementioned angle is then defined by the imaginary extension of the planar side walls or, respectively, of the planar sections of the side wall. In a case of the curved side walls, the aforementioned angle can correspond to the angle of a triangle that the cross-section of the light-refractive elements optimally describes, i.e. with optimally little area deviation between the area of the triangle and the cross-sectional area of the light-refractive element. In the case of a convex side wall, i.e. a side wall curved outward, this angle would be formed by the intersecting angle of two tangents that are applied to the sidelines of the cross-section of the light-refractive element, and, in the case of a concave sidewall, i.e. an inwardly curved sidewall, this angle would be defined by two straight lines that are respectively placed between the head point and the foot point with a side line of the cross-section, i.e. a line corresponding to the sidewall in cross-section.

It can be inventively provided that a respective light-refractive structure having line-shaped structure elements is fashioned in two plates arranged above one another, whereby the lines that define the geometry of the structure of the first plate describe a non-disappearing angle with the lines that define the geometry of the structure of the second plate and preferably reside perpendicularly thereon.

The light-refractive structures can, for example, be manufactured in that a plate or foil of a standard, light-transmissive material such as glass, polyester, polystyrol, polycarbonate, PET or polymethylmethacrylate, is correspondingly processed or shaped on a surface. Alternatively, a foil that contains the light-refractive structure can also be glued onto such a plate.

It can also be provided that at least one of a plurality of plates lying above one another is held at least in sections on another plate by one or more frame elements that overlap this plate.

In order, given an entirely or partially light-transmissive frame, to prevent light that does not meet the shielding conditions from being coupled out in the region of the frame, the light output device can be either lacquered, provided with a silk screening, mirrored or sand blasted at the light exit side in the region of the frame or of the frame elements. Fundamentally, however, this region can remain entirely or partially light-transmissive, namely when the light parts with the exit angle above the shielding angle are so small that the limit value for the average luminance of the entire light exit face, including the regions wherein the light-refractive structures are active, is not exceeded.

According to a preferred embodiment of the invention, the plates with the light-refractive structure generating a shielding are arranged on a carrier plate that has no particular properties influencing the light intensity distribution curve and that preferably comprises two parallel, smooth base surfaces.

In particular, it can be provided that at least two plates with a light-refractive structure generating a shielding are arranged side-by-side on a carrier plate and are connected to the carrier plate.

The invention can provide that the plates provided with a light-refractive structure generating a shielding are held on the carrier plate by at least one frame element which is connected to the carrier plate, and the frame element overlaps one or more of the plates with a light-refractive structure.

Further plates, particularly plates having a light-refractive structure generating a shielding, can be arranged on the plates lying next to one another, so that a plurality of stacks of at least two plates that preferably respectively comprise a light-refractive structure generating a shielding are arranged overall on the carrier plate and are held on the carrier plate in a suitable way, for example by a frame element or a frame.

It is provided according to a specific embodiment that at least two, preferably all structured plates arranged next to one another have the same shape and the same base area.

In particular, the base area of the plates can be quadratic.

According to this embodiment, the lamp can be standardized in that plates having a light-refractive structure are employed that have permanently prescribed dimensions. These plates can then be manufactured in greater numbers and, thus, more cost-beneficially.

Further features and advantages of the invention derive from the following, detailed description of an exemplary embodiment with reference to the attached drawings and claims.

BRIEF DESCRIPTION OF THE DRAWINGS

FIG. 5 is a partial enlarged cross-sectional view taken along the line V—V of FIG. 2;

FIG. 6 is a partial enlarged cross-sectional view taken along the line VI—VI of FIG. 2;

FIG. 7 is a bottom plan view of an embodiment of a second light unit of an inventive system;

FIG. 8 is a bottom plan view of an embodiment of a third light unit of an inventive system;

FIG. 9 is a bottom plan view of an embodiment of a fourth light unit of an inventive system.

DESCRIPTION OF THE PREFERRED EMBODIMENTS

FIGS. 1 and 7 through 9 schematically show four different light unit types that can be part of an inventive system of light units, whereby the inventive systems are not limited to systems having the illustrated light units or units having similar or coinciding properties.

Figure 1:
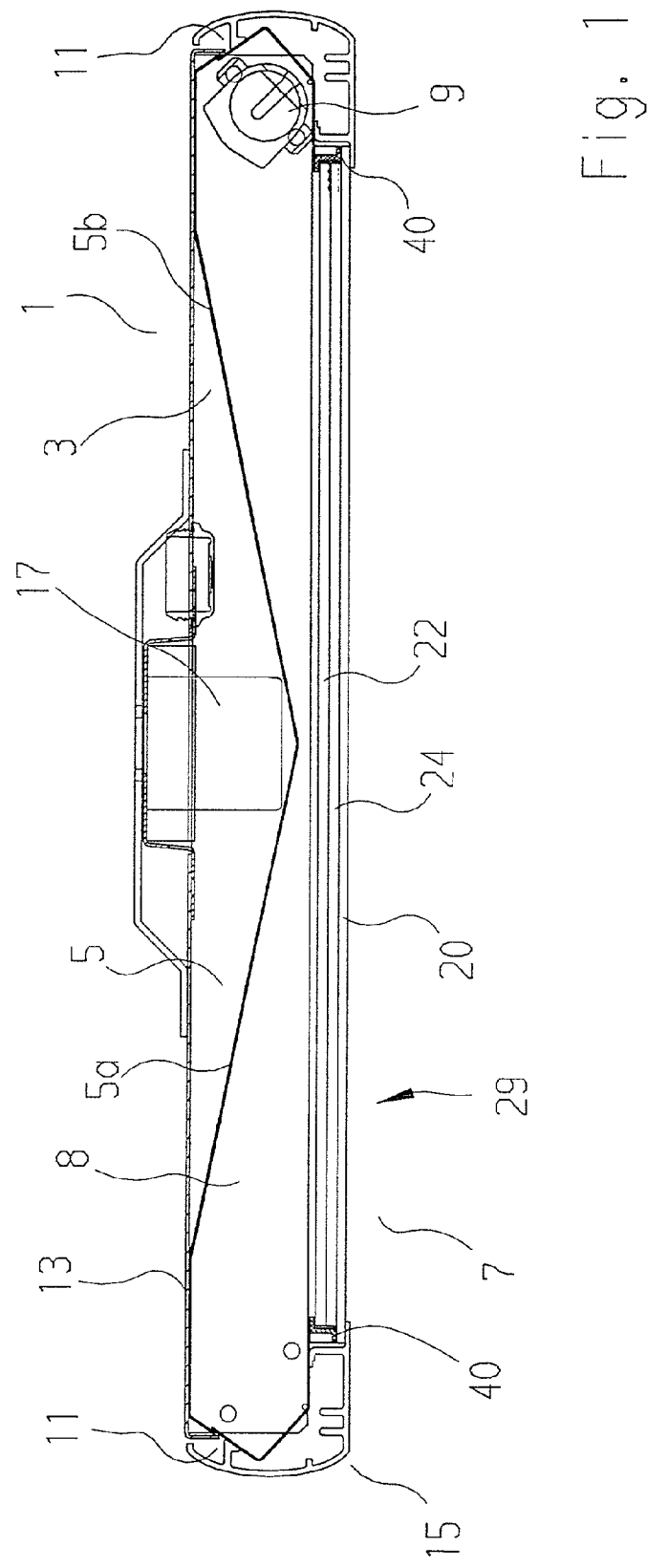
FIG. 1 is a schematic cross-section through a light unit of an inventive system.

FIG. 1 schematically shows an example of an embodiment of a light unit or luminaire of an inventive system of light units. The light unit according to FIG. 1 comprises a housing, generally indicated at 1, in which a hollow light guide 3 is arranged. The hollow light guide 3 is composed of a reflective roof wall or cap reflector 5 having two halves 5a and 5b inclined at an obtuse angle relative to one another, reflective face or end walls (not shown) at the two end faces as well as a light output device 7 that shall be described in greater detail. The face walls, the roof wall 5 and the light output device 7 together define a cavity 8 with reflective walls.

The hollow light guide 3 is respectively opened at the two narrow sides. A respective lamp 9 (only shown at one side in FIG. 1) is arranged at these open narrow sides, and the lamp couples light into the hollow light guide 3 via an input reflector 11.

The housing 1 is composed of an upper housing half 13 to which the roof wall is secured as well as side members or ledges 15, which overlap the hollow light guide 3 and edge portions of a bottom surface of a light output device 7 and holds the light output device 7 to the hollow light guide 3.

A ballast device 17 is secured to the upper housing half or part 13, and the ballast device 17 extends into the region above the hollow light guide 3 wherein the two roof halves 5a and 5b have a reduced spacing from the light output device 7. Accordingly, the halves 5a and 5b define an enlarged spatial region in the housing above the hollow light guide 3, so that a relatively slight overall structural height can be achieved, which feature is advantageous, particularly given an add-on or pendulum.

The light output device 7 is composed of a carrier plate 20 which has two pairs of quadratic prism plates 22 and 24 or, respectively, 26 and 28 that are arranged above one another. The carrier plate 20 forms the light output surface of the light output device 7 that coincides with a light exit face 29 in the case of this light unit. The prism plates are provided with a prism structure on a base area that generates a shielding of the light emerging via the light output device 7 and that is explained in greater detail below for the prism plates 22 and 24.

The prism plates 22 and 24 are provided with a structure that essentially prevents a light output above a limit angle relative to the perpendicular vis-à-vis the light exit face in specific planes and thereby produces a shielding, and a lowering of the average luminance of the light exit face below a limit value, for example 200 cd/m$^2$, 500 cd/m$^2$ or 1000 cd/m$^2$, as required in the applicable standards or, respectively, proposed standards for picture display screen workstations.

Figure 3:
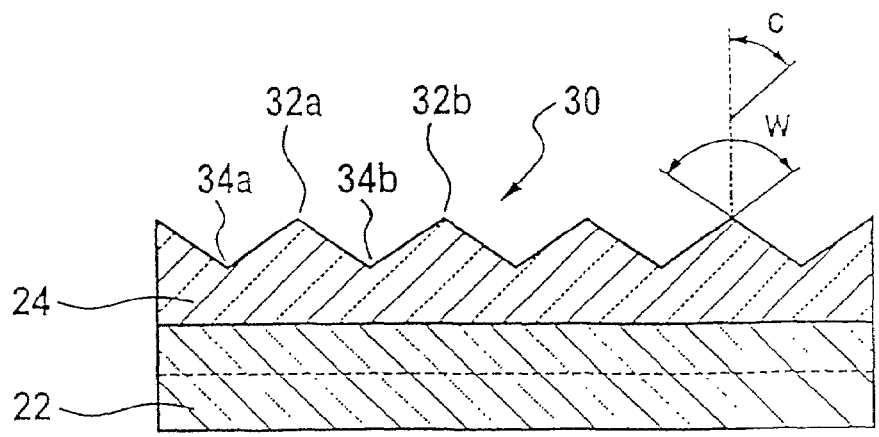
FIG. 3 is an enlarged cross-sectional view of the prism plates taken along the line III—III of FIG. 2.

At its side facing away from the cavity 8, the prism plate 24 has a structure of parallel prisms 30 that have a triangular shape in a cross-section perpendicular to their longitudinal axis, as can be seen with reference to FIG. 3. FIG. 3 shows that the prisms directly adjoin one another, comprise ridges 32a, 32b, ..., which ridges are collectively referenced as 32, uniformly spaced from one another and are separated from one another by depressions 34a, 34b, ..., which are collectively referenced as 34, that are uniformly spaced from one another. The depressions 34 and the ridges 32 form straight, parallel lines at that surface of the plate 24 facing away from the cavity 8.

The shielding can, for example, be produced by total reflection in the prisms. Light in the prisms, given incidence on the boundary surface to an optically thinner medium, for example air, is completely reflected back into the prisms when the incident angle is greater than the angle for the total reflection. Accordingly, the exit angle for the boundary surfaces of the prisms is limited. The side walls of the prisms between the ridges 32 and the depressions 34, however, reside obliquely relative to the light exit face, so that the limitation of the light exit angle by the limit angle of the total reflection does not necessarily mean a shielding. One possible criterion for a shielding can be derived so that the exit angle with respect to a perpendicular relative to the base area of the light-refractive structure is maximally equal to the shielding angle for the beam paths in the prism up to a predetermined maximum number k (for example, k=1, 2, 3 or 4) of internal reflections in the prisms before a light exit from the structure. Other shielding mechanisms or shielding criteria can also be alternatively or additionally employed.

It has been shown that a good shielding is achieved for prisms having a cross-section in the form of an equilateral triangle when the following relationships exist between the shielding angle C and the prism angle w for a boundary surface to air:

$$w/2 \leq C \qquad (1)$$

$$w \geq 2(2 \arcsin(1/n) + 90)/3 \qquad (2)$$

$$\tan(w/2) \leq (n \sin(\arcsin(1/n) - 3w/2) + \cos(w/2))/(n \cos(\arcsin(1/n) - 3w/2) + \sin(w/2)), \qquad (3)$$

whereby n is the refractive index of the plate 24.

The prism angle w for the currently preferred embodiments with a refractive index of 1.49 lies in the range from 90° through 130°. Preferably, w is in the range from 110° through 128°.

Instead of the triangular prisms shown in FIG. 3, other prism shapes can also be employed.

Figure 4:
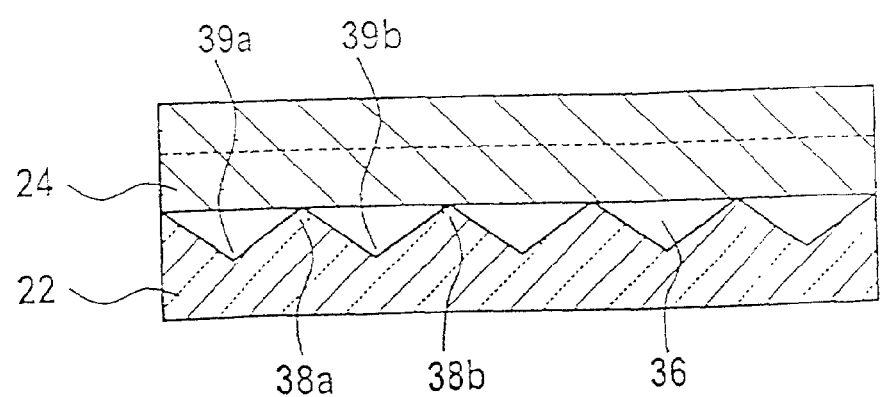
FIG. 4 is an enlarged cross-sectional view of the prism plates taken along the line IV—IV of FIG. 2.

The prism plate 22 (see FIG. 4), like the plate 24, is provided with a structure of parallel, straight line prisms 36 that comprise ridges 38a, 38b, ..., which are collectively referenced as 38, and that are separated from one another by depressions 39a, 39b, ..., which are collectively referenced as 39. Just like the prisms 30, the prisms 36 produce a shielding in the direction transversely relative to their longitudinal axis, whereby the relationships (1) through (3) can be particularly satisfied. As can be seen with reference to FIGS. 3 and 4, the longitudinal direction of the prisms 30 is perpendicular to the longitudinal direction of the prisms 36. Together, the prism plates 22 and 24 therefore generate a shielding in planes perpendicular relative to one another that reside perpendicularly on the light exit face 29. In this way, a shielding is produced in at least two planes. The shielding angle C can be different in these two planes. Accordingly, the prisms 30 and 36 can also exhibit a different prism angle w.

For the sake of completeness, let it be noted here that the illustrated prisms can also generate a shielding in planes between the two planes perpendicular to the respective longitudinal direction. The same can also apply to other prism shapes.

The prism plates 26 and 28 have the same structure as the prism plates 22 and 24 and are aligned in the same way relative to one another. The prisms of the plate 22 lie parallel to those of the plate 26 and those of the plate 24 lie parallel to those of the plate 28.

Figure 2:
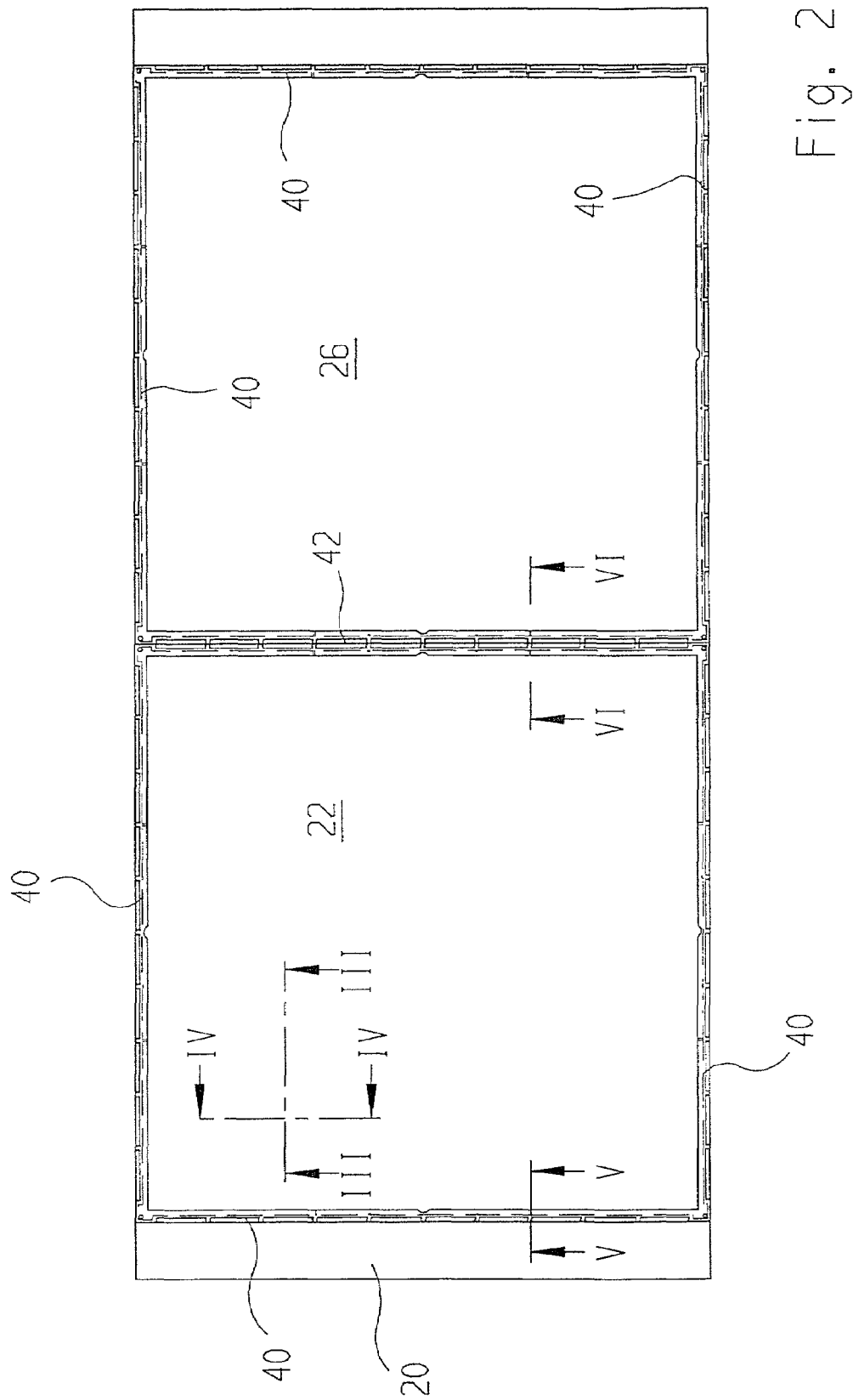
FIG. 2 is a schematic plan view of a carrier plate with the prism plates mounted thereon.

The prism plates 22 and 24 or, respectively, 26 and 28 are held at the carrier plate 20 with frame or spacer elements 40 and 42 (see FIG. 2). The type of connection is shown in detail in FIGS. 5 and 6. A frame element 40 is provided at the outer edges or sides for the fastening of the prism plates. The frame element 40 comprises a central section 44 at which flanges 46 and 48 adjoin at a right angle at both ends, and these flanges 46 and 48 point in opposite directions. The flange 48 is glued on the plate 20. The flange 46 overlaps the plates 22 and 24 (or, respectively, 26 and 28) and thereby holds these positively locked on the carrier plate 20.

A U-shaped frame or spacer element 42 is provided in the inside of the light output face in the region between the pairs of plates 22 and 24 or, respectively, 26 and 28. The U-shaped frame element 42 has two flanges 52 and 54 adjoining at a right angle at opposite sides at its open end, these flanges extending in opposite directions. The base surface 56 of the frame element 42 is glued fast to the carrier plate, whereas the flanges 52 and 54 overlap the plates 22 and 24 or, respectively, 26 and 28. Overall, three frame elements 40 together with the central frame element 42 form a frame for the two plates 22 and 24 that holds these plates positively against the carrier plate 20, and three further frame elements 40 together with the frame element 42 form a frame for the two prism plates 26 and 28 that holds these prism plates against the carrier plate 20. Overall, the carrier plate 20, the prism plates 22 through 28 as well as the frame elements 40 and 42 form a pre-fabricated unit that is introduced into the opening of the hollow light guide 3 and is held at the hollow light guide by the lateral ledges 15. The plates and the appertaining prism structures are thereby correctly aligned relative to one another by the frames 40 and 42 and by the fixing against the carrier plate 20.

For manufacturing the light output device 7, the frame elements 40 and 42 are designed according to the geometry of FIG. 2 with the flange elements 46, 52 and 54 toward the bottom, and, subsequently, the prism plates 22 and 24 or, respectively, 26 and 28 are placed onto the flanges 46, 52 and 54 so that the frame elements 40 and 42 hold the prism plates essentially free of play. Subsequently, the carrier plate 20 is put into place and glued to the flanges 48 and the base section 56. Note that the prism structures of the plates 22 through 28 lie in the inside of the light output device 7. In this way, a unit, which has a smooth, easily cleaned surface on both sides, is formed and the prism structures are terminated by the frame elements 40 and 42 as well as the carrier plate 20. Preferably, the inner region of the light output device, which has the prism structures, is tightly closed, so that dust or other contaminates cannot penetrate into the region of the prism structures. To this end, a seal (not shown) can be provided between the flanges 46 and the flanges 52 and 54 and the prism plate lying therebelow to seal the gap between the frame and the prism plates. The unit is tightly closed by a glued connection to the carrier plate 20 at the opposite side.

The light from the lamp 9 or, respectively, the input reflector 11 is partly directly incident onto the plates 22 and 26. A part of this light passes through the plates 22 and 24 or, respectively, 26 and 28 and emerges at the light exit face 29. Another part of the light is reflected by the plates 22 and 26. The roof wall 5 reflects the light incident directly onto it from the lamp 9 or, respectively, the input reflector 11 as well as the light reflected back to it from the plate 22 or, respectively, 26 downward to the light output device 7.

FIGS. 7 through 9 show further light units that can be a component part of an inventive light system. These light units have the same structure as the light shown in FIG. 1, which shall therefore not be explained again, and differ merely on the basis of the design of the light output device 7. Identical component parts are provided with the same reference characters.

In the embodiment of the light unit according to FIG. 7, a pair of prism plates 59 lying above one another (whereof only the upper plate is visible in FIG. 7) are held on a carrier plate 58 by frame elements 40, as described above with reference to FIG. 4. This embodiment is provided for employment of relatively short fluorescent bulbs, for instance the standard 8 W fluorescent bulbs.

In the exemplary embodiment of the unit according to FIG. 8, four pairs of prism plates 60, 62, 64 and 68 as described above with reference to FIGS. 1 through 6 are secured on a carrier plate 68, whereby the outer edges of the prism plates are held against the carrier plate 68 by the above-described frame elements 40 and the inner edges of the prism plates are held against the carrier plate 68 by the above-described spacer elements 42 and spacer elements 42a. Preferably, the frame elements 40 and 42 are glued to the carrier plate 68. Such an embodiment could, for example, be operated with two standard 21 W fluorescent bulbs that are respectively arranged at an open narrow side of the hollow light guide 3. The elements 42 and 42a have different dimensions FIG. 9 shows an embodiment of the light unit of the invention wherein the distance between the lamps 9 is increased. Four pairs of prism plates 80, 82, 84 and 86 that are fashioned like the above-described prism plate pairs 22 and 24 or, respectively, 26 and 28 are secured in the above-described way on the carrier plate 88 with frame elements 40 and 42. Instead of four individual spacer elements 42, a cross-shaped frame element can also be employed whose four arms are fashioned in cross-section like the spacer elements 42 and that unites the function of the four spacer elements 42 in one component part. This light could, for example, be operated with two 24 W fluorescent bulbs.

The various embodiments of the light units, particularly the embodiments according to FIGS. 1 and 2 and 7 through 9, form component parts of a system of light units that comprises light units for differently dimensioned and, accordingly, fluorescent bulbs that have different lengths, whereby all prism plates employed in this system, i.e. the prism plates 22 and 28 and the prism plates of the pairs 52, 60 through 66 and 80 through 86, have the same dimensions. For various light units of the system, two, three, four or more prism plates are attached on a carrier plate and connected thereto successively in the longitudinal direction of the lamps (see FIGS. 2 and 8) and/or in a transverse direction relative to the longitudinal direction of the lamps (see FIG. 9). These prism plates are attached with the assistance of frame elements 40 and spacer elements 42, so that a composite light exit face arises.

This is advantageous for rational production with high piece numbers, since the prism plates need not be separately fabricated for each type of light unit. A standardized plate type can be employed for each lamp or light unit type.

While the above-described light system was based on a fact that prism plates of the same dimensions were employed for lamps having different length or width, an inventive system of light units—alternatively or additionally—can also be constructed on the basis of different basic elements. For example, all light units of an inventive system can have prism plates with the same dimensions but a respectively different light-refractive structure, so that the light-steering properties and, in particular, the shielding properties are respectively different. A light unit of the system is derived from a different light unit by the corresponding prism plate being replaced. Likewise, a system can be built with the same carrier structure or the same housing being employed and the differently utilized light-technical components such as lamps, input reflectors, prism plates, cap reflectors, etc., being different. Likewise, a further property of the inventive light system can be provided in that standardized cap reflectors or input reflectors are employed, and these have different light-oriented properties for respectively different light units. For example, one light unit of the system can have a cap reflector 5 having two inwardly inclined, planar surfaces, as shown in FIG. 1, a second light unit of the system can have a cap reflector 5' (FIG. 10) of the same length and width but with one or more curved surfaces 5a'; and a third light unit can have a cap reflector of the same length and width that is completely flat, etc. Of course, a plurality of the aforementioned design principles can also be combined. For example, a replaceable cap reflector composed of a plurality of modules of given length that can be combined to form cap reflectors of different length can be employed together with a light output device that, as explained above, is constructed of a plurality of standardized prism plates.

Figure 10:
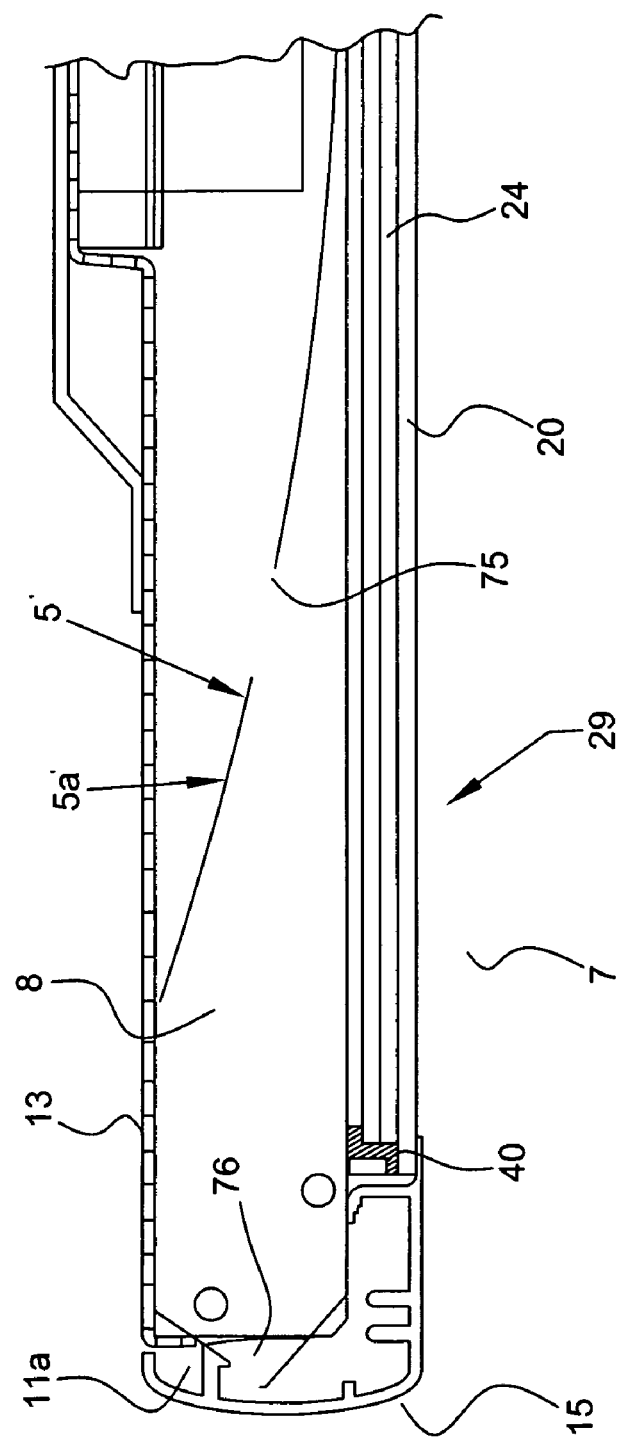
FIG. 10 is a schematic partial cross-section through an embodiment of a light unit of FIG. 1.

As shown in FIG. 10, the cap reflector 5' can be partially transmissive to light to allow indirect lighting. The partial transmissiveness of the reflector 5' can be from holes 75 in the reflective surface or by a reflector which transmits some light. In addition, an input reflector 11a of FIG. 10 can be constructed with openings 76 or partially transmissive reflecting surfaces, so some light from the light source bypasses the hollow light guide and creates an indirect lighting.

Although various minor modifications may be suggested by those versed in the art, it should be understood that we wish to embody within the scope of the patent granted hereon all such modifications as reasonably and properly come within the scope of our contribution to the art.

We claim:

1. A system of light units each having one of a plurality of predetermined light emission properties for illuminating a space, each light unit comprising:
   a support structure comprising a smooth and uninterrupted light permeable plate;
   at least one hollow light guide with a cavity;
   at least one lamp for directing light into the cavity;
   optical components carried by said support structure, said components having light directing properties for influencing the beam path of the light output from the lamp;
   at least one of said optical components being a light permeable component having a medium with a first index of refraction and having a boundary surface with a medium of a second index of refraction different from the first, said light permeable component being part of a light output device and said boundary surface being provided with a non-planar light-refractive structure for deflecting light in at least one plane directed perpendicular to a light exit face, so that the light intensity distribution curve of the light emerging at the light exit face is influenced in this plane;
   at least one of said optical components of each light unit being an element selected from the group consisting of a plurality of cap reflectors having optical properties differing from the others, a plurality of non-planar light-refractive structures having optical properties differing from the others and a plurality of input reflectors having optical properties differing from the others, said element being carried by said support whereby the one or more optical components carried by said support structure determine said one of a plurality of predetermined light emission properties of said light units.

2. A system according to claim 1, wherein the support structure of each light unit of the system has the same dimensions for receiving the element.

3. A system according to claim 1, wherein the element is a reflector selected from the group consisting of a totally reflective cap reflector and a partially light-transmissive cap reflector, so that the light unit can be changed between a direct lighting unit and a lighting unit with some indirect lighting.

4. A system according to claim 1, wherein the selected element is a cap reflector having reflecting properties that affect the light emission properties of the light unit.

5. A system according to claim 1, wherein the light permeable component comprises one or more plate elements having non-planar light refractive structures that affect the light emission properties of the light unit.

6. A system according to claim 5, wherein the non-planar light refractive structure of the plate element essentially prevents a light emission above a limited angle relative to the perpendicular vis-à-vis light exit face in at least one plane perpendicular to the light exit face so that the shielding of light emerging at the light exit face is produced in this plane.

7. A system according to claim 5, wherein the plate elements rest on the smooth and uninterrupted light permeable plate.

8. A system according to claim 7, wherein the plate element is held onto the light permeable plate by at least one frame element.

9. A system according to claim 7, wherein at least two plate elements separated by a spacer element rest on the light permeable plate.

10. A system according to claim 1, wherein the support structure of a group of light units of the system has the same dimensions and the light emission properties are different according to the optical properties of at least one of said optical components being mounted on the support structure.

11. A system according to claim 1, wherein the selected element is an input reflector having reflecting properties and dimensions that affect the light emission properties of the unit.

12. A system according to claim 11, wherein one of the input reflectors completely reflects light into the hollow light guide and another input reflector directs part of the light to bypass the hollow light guide to provide indirect lighting.

13. A system according to claim 1, which has at least two light permeable components with the non-planar light refractive structure, said two light permeable components being arranged in a stack to create a shielding effect at least in two directions perpendicular to each other.

14. A system according to claim 1, wherein, for a group of light units, the light output face by which light is coupled out from the hollow light guide, is different for at least two different light units of said group, said light permeable component is a plate element and the support structure of each said light units of said group has the same dimensions for receiving said plate element.

15. A system according to claim 1, wherein the light units are lighting units for illuminating an indoor space.

16. The system of claim 1 wherein the at least one lamp is located outside of said cavity or at the lateral periphery thereof.

17. A system of light units, each having one of a plurality of predetermined light emission properties for illuminating an indoor space, each light unit comprising:
   a support structure having a smooth and uninterrupted light permeable plate;
   at least one hollow light guide with a cavity;
   at least one lamp for directing light into the cavity;
   one or more optical components carried by said light permeable plate, said optical components having light directing properties for influencing the beam path of the light output from the lamp;
   at least one of said optical components being a light permeable element having a medium with a first index of refraction and having a boundary surface with a medium of a second index of refraction different from the first, said light permeable element being received on the light permeable plate of a light output device of the unit, and said boundary surface being provided with a non-planar light-refractive structure for deflecting light in at least one plane directed perpendicular to a light exit face of the output device so that the light intensity distribution curve of the light emerging at the light exit face is influenced in this plane; and
   a cap reflector mounted on said structure to reflect light in the light guide through the light permeable element,
   at least one of said components being an element that is dimensioned so that it can be used in any one of the light units of the system.

18. A system according to claim 17, wherein the cap reflector is selected from the group consisting of a total reflective cap reflector and a partially light-transmissive cap reflector, so that the light unit can be changed between a direct lighting unit and a lighting unit with some indirect lighting.

19. A system according to claim 17, wherein the light permeable element is a plate element which is secured to the light permeable plate of the support structure.

20. A system according to claim 17, wherein the light permeable elements are plate elements positioned on the light permeable plate with a spacer element disposed between adjacent plate elements and secured to the light permeable plate.

21. A system according to claim 17, which has at least two light permeable elements, said two light permeable elements being plate elements with the non-planar light refractive structure, said two plate elements being arranged in a stack on the light permeable plate to create a shielding effect in two directions perpendicular to each other.

22. A system according to claim 17, wherein the light unit includes a light permeable plate and the at least one optical component is a plate element held onto the light permeable plate by at least one frame element.

23. A system according to claim 17, wherein the first-mentioned element component can be replaced by a second element of the same dimensions and different properties, so that by replacing the first element with the second element, the light unit will have different light emission properties.

24. The system of claim 17 wherein said cap reflector is an element that is dimensioned so that it can be used in any one of the light units of the system.

25. The system of claim 17 wherein the at least one lamp is located outside of said cavity or at the lateral periphery thereof.

26. A method for manufacturing a light unit comprising a support structure, at least one hollow light guide with a cavity, at least one lamp for directing light into the cavity, optical components having light directing properties for influencing the beam path of the light output from the lamp, at least one of said optical components being a light permeable component having a medium with a first index of refraction and having a boundary surface with a medium of a second index of refraction, which is different from the first, said light permeable component being part of a light output device of the unit and said boundary surface being provided with a light-refractive structure for deflecting light in at least one plane directed perpendicular to a light exit face of the output device so that the light intensity distribution curve of the light emerging at said light exit face is influenced in this plane, said light permeable component being a pre-fabricated light permeable component with predetermined dimensions, the method comprising the steps of:

providing said pre-fabricated light permeable component;
providing a light permeable carrier plate having a generally surface;
arranging at least one pre-fabricated light permeable component on said carrier plate in a predetermined area of said carrier plate; and;
fastening said pre-fabricated light permeable component and said carrier plate so that they limit the cavity of the hollow light guide wherein said carrier plate forms the outermost element of the light output device through which the light is output for illuminating a space;
wherein the step of arranging positions the pre-fabricated light permeable component on the carrier plate, the space adjacent the pre-fabricated light permeable component remains uncovered by said component, said uncovered region having an area smaller than the area of the carrier plate covered by said component; and, wherein the step of arranging will position at least two pre-fabricated light permeable components on the carrier plate with an uncovered region there between and positioning a spacer element in the uncovered region.

27. A lighting unit comprising:
a support structure;
a light guide forming a cavity;
a lamp for directing light into said cavity;
a carrier plate carried by said support structure and defining a generally smooth and uninterrupted light emitting surface of said cavity through which light is output having one of a plurality of predetermined light emission properties for illuminating a space; and
an optical component carried by said carrier plate, said optical component having a light-refractive structure and being formed by one or more light permeable elements wherein said carrier plate forms the outermost element of the light output device through which the light is output for illuminating a space.

28. The system of claim 27 wherein the lamp is located outside of said cavity or at the lateral periphery thereof.

29. A lighting unit comprising:
a support structure;
a light guide forming a cavity;
a lamp for directing light into said cavity;
a carrier plate carried by said support structure and defining a light emitting surface of said cavity; and
an optical component carried by said carrier plate formed by two or more light permeable elements positioned side-by-side, adjacent light permeable elements being separated by a spacer element.

30. The system of claim 29 wherein the lamp is located outside of said cavity or at the lateral periphery thereof.

* * * * *